(12) United States Patent
Wilkins et al.

(10) Patent No.: US 12,335,126 B2
(45) Date of Patent: *Jun. 17, 2025

(54) DISTRIBUTED NETWORK DATA MANAGEMENT SYSTEMS AND METHODS

(71) Applicant: Elasticsearch B.V., Mountain View, CA (US)

(72) Inventors: Andrew Wilkins, Perth (AU); Ron Cohen, Copenhagen (DK)

(73) Assignee: ELASTICSEARCH B.V., Amsterdam (NL)

( * ) Notice: Subject to any disclaimer, the term of this patent is extended or adjusted under 35 U.S.C. 154(b) by 0 days.

This patent is subject to a terminal disclaimer.

(21) Appl. No.: 18/615,347

(22) Filed: Mar. 25, 2024

(65) Prior Publication Data
US 2024/0267316 A1      Aug. 8, 2024

Related U.S. Application Data

(63) Continuation of application No. 17/939,509, filed on Sep. 7, 2022, now Pat. No. 11,962,483.

(60) Provisional application No. 63/241,505, filed on Sep. 7, 2021.

(51) Int. Cl.
*H04L 43/10*     (2022.01)
*H04L 41/0686*   (2022.01)
*H04L 41/069*    (2022.01)

(52) U.S. Cl.
CPC ................. *H04L 43/10* (2013.01)

(58) Field of Classification Search
CPC .... H04L 43/10; H04L 41/0686; H04L 41/069
See application file for complete search history.

(56) References Cited

U.S. PATENT DOCUMENTS

| | | | |
|---|---|---|---|
| 10,397,343 B1* | 8/2019 | Goldberg | H04L 67/10 |
| 10,554,701 B1* | 2/2020 | Decker | G06F 21/55 |
| 11,210,156 B1* | 12/2021 | Liu | G06F 11/0739 |
| 11,962,483 B2* | 4/2024 | Wilkins | H04L 43/10 |
| 2018/0150384 A1* | 5/2018 | Alaranta | G06F 16/22 |
| 2021/0149787 A1* | 5/2021 | Nguyen | G06F 11/3636 |
| 2021/0399953 A1* | 12/2021 | Arnold | H04L 43/02 |

* cited by examiner

*Primary Examiner* — Kamal M Hossain
(74) *Attorney, Agent, or Firm* — Quinn IP Law

(57) ABSTRACT

Systems and methods for application performance management across one or more networks are disclosed. A system includes a plurality of geographically distributed computing devices executing one or more applications. A plurality of collectors are distributed across the one or more networks, each collector being positioned proximate a respective computing device. The collectors may sample, by each of the plurality of collectors, a plurality of trace events received from the applications executing on the computing devices proximate the collector. The collectors may retain in memory sampled trace events that meet a configurable attribute. The collectors may use probabilistic sets and tail-based sampling to determine root events and policies for identifying relevant traces. Benefits can be achieved in bandwidth savings, network cost and cyber security.

16 Claims, 3 Drawing Sheets

DISTRIBUTED NETWORK DATA MANAGEMENT SYSTEMS AND METHODS

CROSS REFERENCE TO RELATED APPLICATION

This is a continuation of, and claims priority to, U.S. patent application Ser. No. 17/939,509, filed on Sep. 7, 2022, which claims priority to, and the benefit of, U.S. Provisional Patent Application No. 63/241,505, filed on Sep. 7, 2021, each of which is incorporated by reference herein in its entirety.

INTRODUCTION

The present disclosure relates to networks. More specifically, the present disclosure relates to distributed network data performance management systems and methods.

Tracing in networking and computer science applications entails specialized logging of so-called trace events to record information about a computer program's execution. A trace may include a process of following the execution of the program or other network-based activities such as network access and hopping, from the beginning to the end. A trace can be represented by a trace ID, or a unique value for tracking a particular sequence of trace events throughout the lifetime of an application, for example. Present data and application performance monitoring (APM) techniques work by routing trace events by trace identifier (ID), such that all events relevant to a trace are available to be sampled consistently by a single collector for use in objectives like identifying and diagnosing network problems, addressing programming errors and latencies, and the like.

Conventional tracing procedures may give rise to a particular challenge in the context of multi-network applications (e.g., multi-cloud, or multi-availability zone, etc.). These challenges may arise based on factors including but not limited to the different network protocols, a system's finite bandwidth, and the sheer amount of trace events that may be involved in a trace. Collecting these trace events across multiple networks for analysis and diagnosis can create undesirable delays and generate expensive inter-network data transfers proportional to the full event rate.

SUMMARY

Accordingly, in one aspect of the disclosure, techniques and systems are disclosed that minimize or altogether obviate the aforementioned problems. In one such configuration, two or more collectors are distributed across a multi-network environment. Distributed trace events may be sent to collectors that are closest (e.g., in network or geographical proximity, or that are least costly, e.g., based on the network implementation) to the application source. In other aspects of the disclosure, the distributed collectors can selectively retain a useful set of sampled data by considering an outcome of a trace and considering only those sampled trace events with a desired outcome. In still other aspects of the disclosure involving extremely high volumes of collector-sampled traces, the collectors under certain circumstances enumerated below may elect to communicate a probabilistic set of sampled trace IDs, rather than individual trace IDs. Further data transfer reductions can be achieved with this approach, described further below, with few compromises (if any) to data integrity and effectiveness of application performance metrics.

In one aspect of the disclosure, a method of application performance monitoring in one or more networks is disclosed. A plurality of respective applications are executed on two or more computing devices located in at least two different geographical regions and connected via the one or more networks. A plurality of collectors are distributed across the one or more networks. Each collector is positioned proximate a respective computing device of the two or more computing devices. The method further includes sampling, by each of the plurality of collectors, a plurality of trace events received from the applications on the computing devices proximate the respective collector. The collector retains in local memory sampled trace events that meet a configurable attribute.

In another aspect of the disclosure, a system for distributed data management is disclosed. The system includes a plurality of computing devices geographically distributed and coupled via one or more networks. Each computing device is configured to execute at least one application. The system further includes a plurality of collectors. Each collector is located proximate one of the computing devices. Each collector is configured to sample a plurality of trace events from the one of the computing devices. Each collector is further configured to retain in local memory sampled trace events that meet a configurable attribute.

In still another aspect of the disclosure, a system for application performance monitoring across one or more networks is disclosed. The system includes a plurality of computing devices geographically distributed across the one or more networks. Each computing device is configured to execute at least one application. The system further includes a plurality of collectors. Each collector is located proximate one of the computing devices. Each collector is configured to sample a plurality of trace events from a proximate one of the computing devices based on a configurable policy. Each collector is further configured to buffer non-root sampled trace events for a configurable duration.

The system further includes an orchestration server. The orchestration server is configured to receive a representative indication of a sampling decision sent from a collector when the collector samples a root trace event. The orchestration server is further configured to propagate the sampling decision to collectors to retain in local memory buffered trace events related to the root trace event.

The above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes combinations and sub-combinations of the elements and features presented above and below.

BRIEF DESCRIPTION OF THE DRAWINGS

Various aspects of the disclosure will now be presented in the detailed description by way of example, and not by way of limitation, in the accompanying drawings, wherein.

Figure 1:
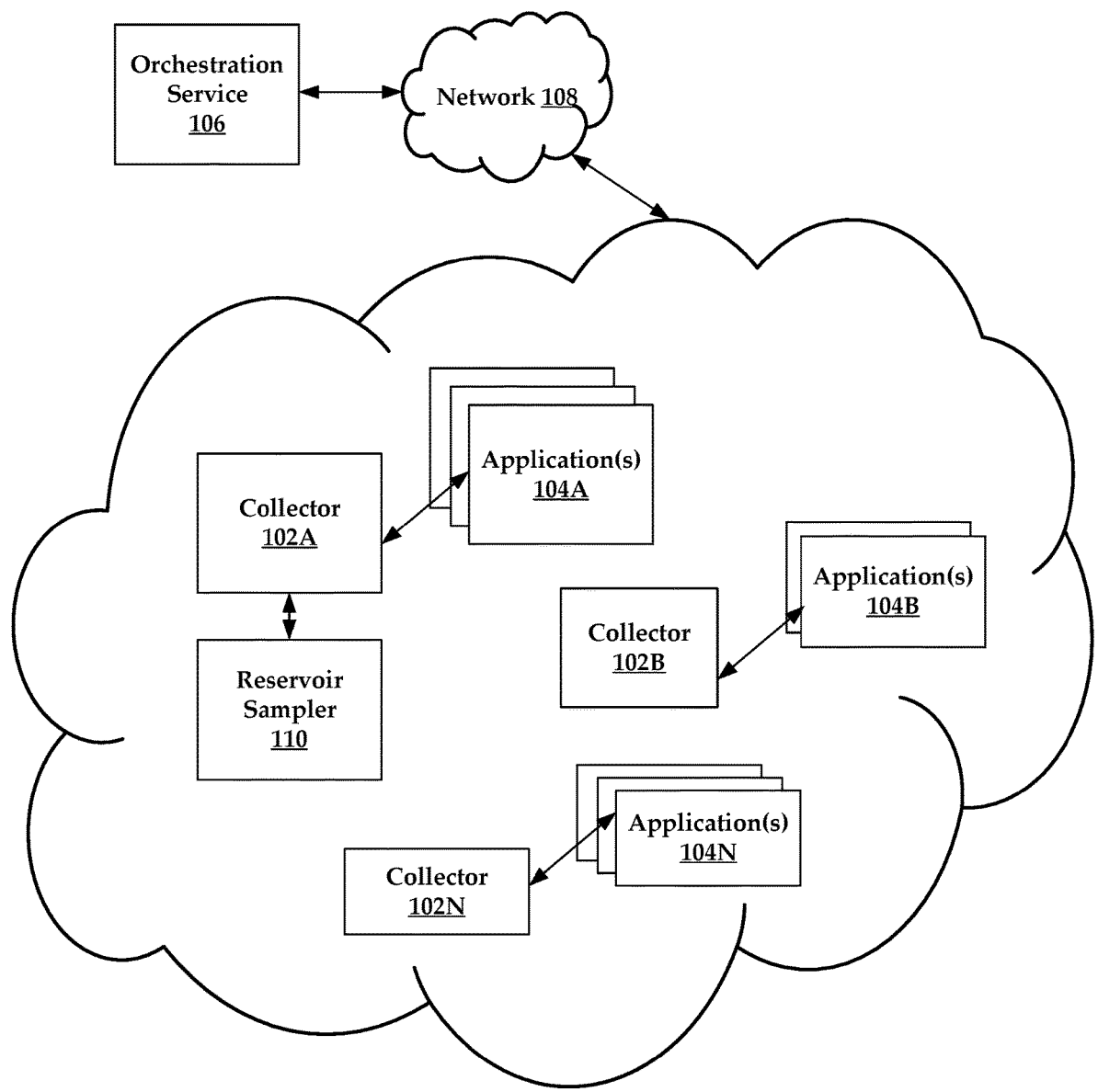
FIG. 1 is an example block diagram of a plurality of collectors arranged throughout an exemplary network for collecting distributed trace events and other information from a plurality of applications, along with an orchestration service and an exemplary reservoir sample, in accordance with various embodiments of the disclosure.

The present disclosure is amenable to various modifications and alternative forms, and some representative embodiments are shown by way of example in the drawings and will be described in detail herein. It should be understood, however, that the novel aspects of this disclosure are not limited to the forms illustrated in the above-enumerated drawings. Rather, the disclosure is to cover all modifications, equivalents, combinations, sub-combinations, permutations, groupings, and alternatives falling within the scope of this disclosure as encompassed, for example, by the appended claims.

DETAILED DESCRIPTION

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Introduction, Summary, and Detailed Description sections, but not explicitly set forth in the claims, should not be incorporated into the claims, singly or collectively, by implication, inference or otherwise. Further, for purposes of the present detailed description, unless specifically disclaimed or otherwise clear from the context: the singular includes the plural and vice versa; the words "and" and "or" shall be both conjunctive and disjunctive; the words "any" and "all" shall both mean "any and all"; and the words "including," "containing," "comprising," "having," and the like, shall each mean "including without limitation."

As used in this disclosure, the terms "component," "module," "system" and the like are intended to include a computer-related entity, such as but not limited to hardware, firmware, a combination of hardware and software, software, or software in execution, etc. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Aspects of the present disclosure are directed to distributed network data management systems and methods. In various embodiments, these systems and methods are configured to provide one or more of at least the following benefits: (i) reducing network traffic, which in turn can result in reduced network latency, jitter, lag, etc., (ii) reducing computing resource usage and requirements, (iii) minimizing data storage costs, (iv) enhancing network security, as shown in greater detail below; and (v) improve the overall performance of a computing system, including increasing speed, robustness and reliability of both the constituent network components and the system as a whole, as these benefits pertain to the collection and analysis of trace events using the techniques disclosed herein.

As briefly noted above, present commercial data management and application performance monitoring techniques function by routing trace events identified based on their corresponding trace ID from a component executing an application to a single collector component (hereinafter sometimes "collector"). In this manner, all trace events corresponding to that trace ID can be received by the collector, and at least in theory, can be sampled consistently for identifying different events. Sampling is a technique for retrieving data according to certain rules. These rules can include periodic sampling, root sampling, and others.

Sampling may be dependent on rules like the data types, the throughput of the applications, data retention policies, and other factors. In some embodiments, a sampling rate from 0.1% to 100% may be used. Different sample rate for different scenarios. One example includes that services with considerably more traffic than others may be safe to sample at lower rates. In another example, routes that are more important than others might be sampled at higher rates. Failed trace outcomes might be more interesting than successful traces—thus requiring a higher sample rate.

Distributed tracing can generate a substantial amount of data. More data can mean higher costs and more noise. Sampling aims to lower the amount of data ingested and the effort required to analyze that data—all while still making it easy to find anomalous patterns in your applications, detect outages, track errors, and lower mean time to recovery (MTTR). In head-based sampling, the sampling decision for each trace is made when the trace is initiated. Each trace has a defined and equal probability of being sampled. In tail-based sampling, for example, the sampling decision for each trace is made after the trace has completed. This means all traces will be analyzed against a set of rules, or policies, which will determine the rate at which they are sampled.

Unlike head-based sampling, each trace does not have an equal probability of being sampled. Because slower traces are more interesting than faster ones, tail-based sampling uses weighted random sampling—so traces with a longer root transaction duration are more likely to be sampled than traces with a fast root transaction duration.

In multi-network implementations often involving different clouds, multiple availability zones, and different network types, as is common in the context of corporations, organizations government-entities, contractors and the like, this single-collector model has shortcomings.

One such shortcoming is that in such multi-network settings, a significant number of potentially expensive and bandwidth-intensive data transfers must take place to transfer the trace events from their executing application of origin to the collector, regardless of the distance and number of necessary network hops between origin and destination. With such significant traffic flow relating solely to data systems management, less bandwidth remains for other types of routine network transfers, thereby naturally producing increased network latencies. This problem can be exacerbated when disparate clouds and network types are part of the infrastructure under scrutiny. Where the overall number of trace events increases, so too can the adverse effects on the network(s). Another potential disadvantage of these conventional approaches is that the collector becomes a single point of failure, since it is relied on heavily, if not singly, for properly executing data management tasks and forwarding the proper information, where necessary, to the correct destination.

Accordingly, in one aspect of the disclosure, application program performance/data management systems and methods are disclosed in which a plurality of collectors are physically or geographically distributed across a range of locations within the multi-network platform. Following setup of the collectors and their connections, along with the necessary programming and configuration of the remaining network components, data management can commence. In various embodiments, in lieu of reliance on a single collector, distributed trace events may be sent to collectors that are closest to the source application from which the distributed trace event originated (taking into account network cost, geographical and network proximity, any cloud transfer charges, and related criteria), as opposed to being potentially routed across different networks, for example. At the outset, one advantage of these embodiments includes reduced network transfer costs. In multi-network applications, inter-network data transfers according to these embodiments become proportional to the sampled event rate, rather than being proportional to the full event rate as evidenced in conventional approaches herein.

In other aspects of the disclosure as described in more detail below, these systems and methods can further effectively manage multi-network environments by reducing network traffic. In some embodiments, the collectors in the distributed set may achieve this objective by discriminating in the analysis and further processing of received trace events to only include certain selected outcomes of traces, or certain types or characteristics of traces. For example, a collector in the system can elect to consider a selected outcome of a trace, such as an outcome that may stand out as more important to assess at a given time. The collector may proceed to retain a useful set of data specific to that selected outcome, while discarding sampled trace events that are inconsistent with the outcome. In other embodiments, the collector (or user thereof) may elect to retain trace data having a particular type or characteristic. In this manner, only select trace events (or their less data-intensive representations such as trace identifiers (IDs)) are transferred over the network to a destination, while other trace events resulting in different outcomes, or different trace events, may be discarded and not further transmitted. In retaining sampled trace events only relevant to more important selected outcomes, these systems and methods can be configured to reduce network traffic (resulting again in reduced network latency, jitter, lag, etc.), reduce computer resource usage, minimize data storage costs, and enhance network security, as they pertain to the collection and analysis of distributed trace events. Examples of a particular outcome or type of a trace may include identifying the overall latency of the trace, such as preserving trace outcomes that result in a delay that exceeds a latency threshold. In determining whether to retain a trace, a specific latency threshold may be determined Other non-exhaustive examples may include identifying success (or failure) of a trace, identifying traces that have fact-specific outcomes, and the like.

Yet another aspect of the disclosure may include suitably addressing instances where the collectors receive extremely high volumes of sampled traces, and where false positives (e.g., extraneous trace events indicating that a given element may be within a set when it is in fact not in the set) are acceptable. In these instances, the collectors may instead be configured to communicate a probabilistic set (e.g., a Bloom Filter) of sampled trace IDs rather than individual trace IDs. The exemplary Bloom filter is an efficient, probabilistic data structure used to identify whether an element is a member of a set. While Bloom Filters may produce false positive matches, they do not produce false negative ones, meaning that the Bloom Filter can always identify that a given element is definitely not in a set). At some point in time, the high volume of sampled traces would help ensure that the size of sampled trace IDs would surpass the size of a probabilistic set, so this approach would further reduce data transfers, thereby increasing multi-network efficiency.

Reference is now made to FIG. 1, wherein like reference numbers refer to like features throughout the different views. FIG. 1 is an example block diagram of a plurality of collectors arranged throughout a network 108 for collecting distributed trace events and other information from a plurality of applications 104A-104N, along with an orchestration service 106 and a reservoir sampler 110, in accordance with various embodiments of the disclosure. Orchestration service 106 may be an application executing on one or more orchestration servers, or computing devices such as those described with reference to FIG. 2. While the network 108 is shown as one network for purposes of simplicity and to avoid unduly obscuring concepts of the disclosure, in practice the network 108 can include a plurality of potentially disparate networks, including for example different cloud services, local area networks, wide area networks, Wi-Fi networks, virtual private networks, and the like.

Figure 2:
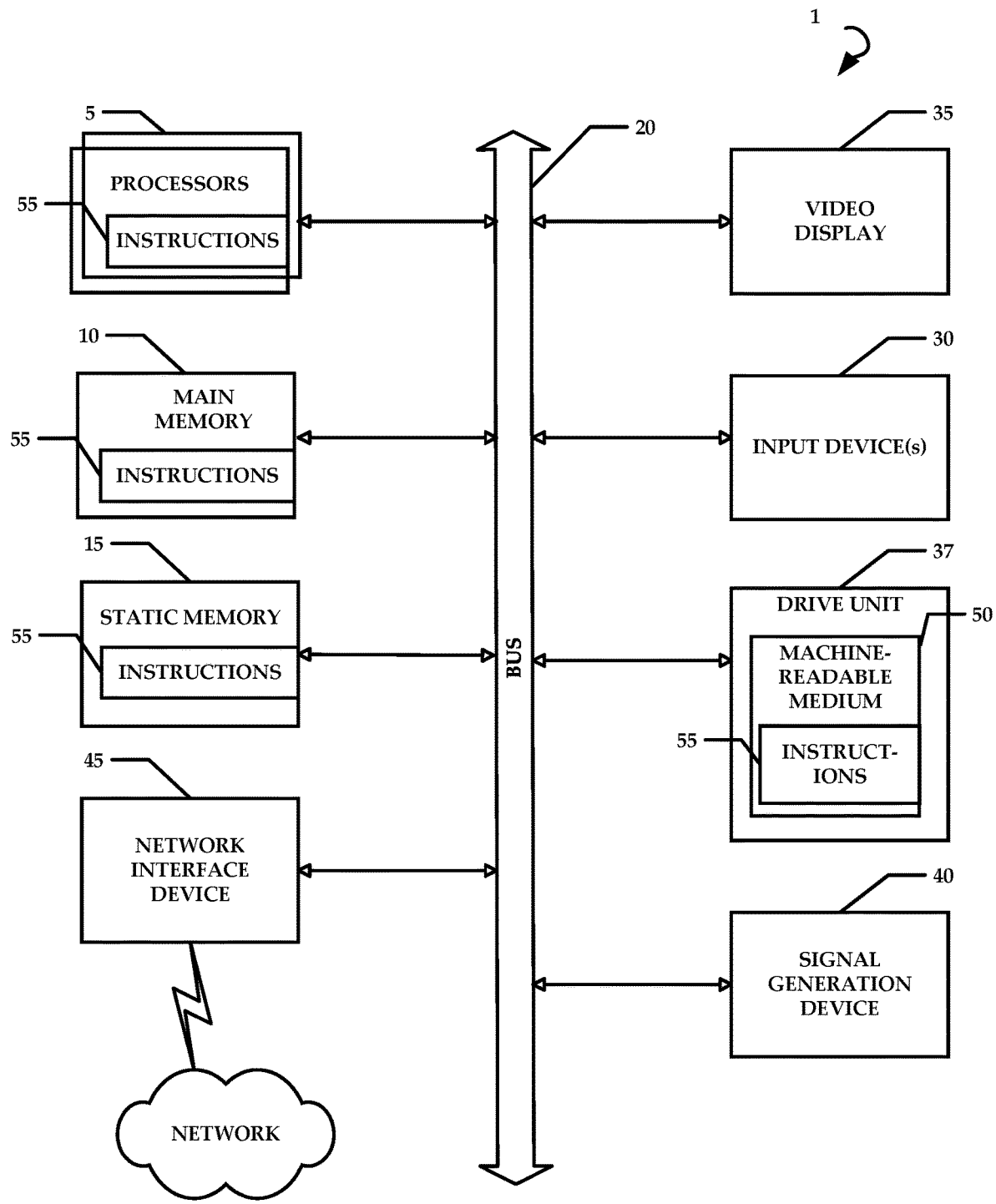
FIG. 2 is an example block diagram of a set of connected hardware features that may be used to perform one or more collection and analysis functions, in accordance with various embodiments of the disclosure.

The exemplary system described in FIG. 1 can include a plurality of collectors such as distributed collectors 102A, 102B, . . . 102N. The collectors may be implemented in software, hardware, firmware, or some combination thereof. In various embodiments, the collectors 102A, B, . . . N each include an application running on a dedicated computing device. In some embodiments, the collector is an application installed on a server. Among other features as described herein, the collector may transmit metadata retrieved over the network 108 about an asset such as an application, or a configuration of the asset such as a timing, latency, capacity, and other performance or characteristic criteria. The information may be information other than metadata. The collectors 102-A, B, . . . N may be placed in proximity to application(s) 104A-104N. Each application(s) 104A, 104B, etc. through 104N may be executed on one or more processors 5 (FIG. 2). For simplicity, collector 102A is deemed in this example to include a single computing device (e.g., computer system 1 or a portion thereof (FIG. 2)), although in practice a different number of computing devices in a given region may be equally suitable. Further, application(s) 104A may include one or more applications executing on one or more processors (respectively or otherwise) residing on a single computing device that is proximate the collector 102A. In like manner, collector 102B may include a single computing device positioned in the network 108 proximate the computing device that is executing application(s) 104B. Application(s) 104N may include one or more applications running on a computing device. Collector 102N is placed proximate the computing device corresponding to application(s) 104N. In other embodiments, any of application(s) 104A, B, . . . N may be executing on one or more computing devices. The applications 104A-N may, but need not, be executing simultaneously. For example, if application(s) 104B includes five applications, the applications may be running simultaneously, sequentially, or at different times altogether.

For purposes of this disclosure, the term "proximate" may refer to a collector that is close or near in geographical location to a computing device executing an application relative to other collectors. In some embodiments, "proximate" refers to a collector or that is generally local to (or in some embodiments directly connected to) the application-running computing device. A collector that is connected to the same local network may be proximate other computing devices, for example, when other collectors are located on different networks that have a longer path delay. One collector may be close to or proximate more than one computing device. Proximate is distinguishable from computing devices that are remote from each other, such as in different regions of the country.

For simplicity, the boxes that respectively represent application(s) 104A, 104B, . . . 104N each also implicitly include the computing device. Thus, for example, application(s) 104N may represent one or more applications running on a computing device that is located proximate the collector 102A, even though three boxes are illustrated for application 104(N). In other embodiments, any of the applications 104A-N may be run on more than one computing device.

The different collectors 102A, B, . . . N that are located proximate the different applications 104A-104N on network 108 may in fact be located on multiple networks that are communicatively coupled together. The multiple networks may be structurally or functionally similar or distinct. The multiple networks of network 108 may include one or more cloud networks, folders on remote servers, etc., and they may be linked by a private Intranet, the Internet, a local, wide or metropolitan area network, or some combination thereof.

An orchestration service 106 may include one or more computing devices (e.g., computer system 1 or a portion thereof in FIG. 2) that can communicate with the distributed collectors 102A-102N. In some instances, the application(s) 104A-104N are located in various tenants (virtual spaces) in a cloud. Orchestration service 106 can also be located in the cloud but can also reside outside the cloud environment and can communicate with the distributed collectors 102A-102N through a network 108 that can include any public and/or private network as described above. While these collectors and applications may appear in the drawings as being located in close proximity to one another, in practice they can be widely distributed across tenants in a cloud, multiple clouds, or in remotely spaced and distributed servers or other computing devices.

The system shown in FIG. 1 enables tail-based sampling, which includes sampling of event data based on properties of a trace known only after the trace completes. One example includes identifying root transaction duration and outcome. This enables users and/or collectors 102A-N to retain traces based on how interesting they are to a user, specialist, or organization. To solve problems, for example, some preferring to keep slower traces, or traces with a failure outcome. The construction and configuration of the system of FIG. 1, together with the aspects above, reduces or avoids network transfer costs which otherwise add a significant computing load. A distributed collector system of the present disclosure can individually reservoir-sample root transactions and synchronize sampling decisions to index any other events that are part of sampled traces. The distributed collectors disclosed herein can also be configured for local event storage or tailored for tail-based sampling. A root transaction includes the object for which an initial transaction was created. Generally, one root transaction exists within a transaction. The root transaction may in some examples include an associated transaction stream. The transaction stream may be responsible for supplying a series of transactions to the root object, and to all non-root objects, as appropriate. Reservoir-sampling includes a family of randomized algorithms for randomly choosing K samples (where K is an integer) from a list of n items, where n is a number that is very large or unknown.

In an exemplary embodiment, fulfillment of a request (such as an HTTP request, for example) can result in distributed trace events being generated by the applications 104A-104N. These distributed trace events can be sent to distributed collectors (e.g., 102A-102N) that are co-located with (or closely situated to) the originating applications. For example, a distributed collector 102A may be located in a same tenant environment with the application(s) 104A producing event data in a cloud. More than one distributed collector can be associated with different applications. In some instances, there can be one collector per application, but other configurations can be used as well. Applications can be run on any type of computing device, including without limitation a multiprocessing server, a personal computer (PC), a laptop computer, a handheld device, tablet, or other generic or dedicated mobile, portable, or transportable computing device of any kind.

Multiple applications or endpoints can send data to different collectors. While three collectors 102A, B, and N are physically shown in FIG. 2, the letter N can be any integer and the collectors 102A-N can reside in spaces across multiple networks. Each collector 102A-N can identify events that are related to a request and can identify a root of a directed acyclic graph (DAG). A DAG graph is a conceptual representation of a group of activities. The collector (e.g., collector 102B) can build a DAG from event data and identify the root of the DAG. In general, a root event is a first event in a series of events or requests. These events are identified and put into a sampling reservoir. For example, a processor of the collector 102A in the set of distributed collectors 102A-102N can pass root transactions through a reservoir sampler 110, and periodically "finalize" the sampling reservoir(s) to make local sampling decisions. The resulting sampled trace events can be indexed by the orchestration service 106; sampled trace IDs are published for other servers or systems so that they can index related events. Sampled trace IDs are one example of representative information that can be sent in lieu of the entire trace event, with one objective of substantially reducing network traffic.

Any collector 102A-102N in the distributed set of collectors can receive the root events and determine which root events are of interest. In various embodiments, a root event can be of interest when it produces a certain latency, cost, or other similar criteria. Root events can be analyzed to determine how long an entire operation takes (e.g., a distributed request), which indicates an overall time of the operation. The collector (e.g., collector 102A) can publish a sampling decision to an orchestration service 106, which may propagate this decision information to other collectors (e.g., collectors 102B-102N) in the distributed set. Other collectors may have been buffering events (on disk or in memory). The receiving collectors 102B-102N may publish events based on the events determined by the collector to be of interest and that were propagated to it. One relevant characteristic of the transaction includes the duration of a root transaction. In some embodiments, a collector receiving this information may make a weighted sampling decision (e.g., to keep all slow requests). Alternatively, or additionally, a collector may also look at the transactions of another collector at errors. For example, one collector may receive and consider events such as errors associated with monetary values, or other criteria deemed relevant to a transaction.

In another example, the collector may be located in a container with an application or applications producing event data. In general, the container can be placed in proximity to one or more applications producing event data, which means that a network distance can be minimized. For example, the number of network hops used to get the data to the collector from the application(s) can be minimized.

The collectors 102A-102N can evaluate event data, determine root trace events and transmit event data, allowing for reconstruction of data flow through a network or plurality of networks to allow users to diagnose potential network problems. In some examples, collectors can buffer non-root trace events for a configurable period of time, in memory and/or on disk. Once the configured duration elapses, buffered events can be discarded. The collectors 102A-102N can determine root trace events in the event data. Root trace events may be categorized according to user-defined rules (e.g., successful vs. failed transactions), and may be sampled locally at the collector according to a user-defined sampling algorithm (e.g., weighted random sampling). While weighted random sampling is an example algorithm, other similar algorithms known to one of ordinary skill in the art may also be utilized. These processes are generally referred to as tail-based sampling. As noted, tail-based sampling occurs after the fact (e.g., after the event), and identifies, for example, slowest events (latency). Numerous other event characteristics can be identified in other examples.

In some embodiments, each time a root transaction is identified, the collector identifying the root transaction can determine if the root transaction should be added to a sampling reservoir. As noted above, the root event can be identified based on latency and/or name of event, among other criteria. A root event can in various embodiments be identified by transforming the event data into a directed acyclic graph (DAG) or a hierarchical tree. Thus, events have a parent-child relationship and the first-of-all events is the root event. In one example embodiment, the event relates to an HTTP request to endpoint. The tree or graph created for this request may include data related to functions that are invoked in performing the HTTP request, but the HTTP request is the root transaction or event.

In some embodiments, when a root trace is sampled by the collector, the decision made by the collector (e.g., to preserve or persist the root trace) is communicated to other collectors in the distributed set so that they can persist the related, buffered trace events. These events can be stored locally in a cache or on disk.

In one example, a collector 102A can push its decision to the orchestration service 106. The orchestration service can propagate the decision to other collectors, e.g., collectors 102B-102N. In some embodiments, positive sampling decisions are communicated, and only minimal information (e.g., a trace identifier) is communicated to the receiving collectors, such that inter-network data transfer is minimized.

Advantageously, the systems and methods disclosed herein can not only improve network performance, but also enhance cyber security. For example, cyber security can be improved due to the reduction in network traffic provided by the use of distributed (e.g., localized) collectors. This is in contrast to conventional solutions where collectors transmit all their event data to the orchestration service 106. The orchestration service 106 conventionally determines the root events and then creates the sampling reservoir. Allowing the collectors to make these decisions locally, as in the present disclosure, eliminates or reduces the need to transmit such data to the orchestration service. In the embodiment described above, the orchestration service needs only to forward the localized root event determinations made by one distributed collector to other distributed collectors. In sum, decisions are localized, which reduces network traffic and computer resource overuse.

According to some embodiments, the systems and methods can be configured for revising tail-sampling configurations, removing the default sampling rate and introducing configurable sampling policies.

Each policy may define criteria to match root transactions, and a sampling rate. Policies can be evaluated in the order specified, comparing the specified attributes against incoming root transactions. Policies can also match non-root transactions or even spans, at some additional cost. Example attributes that can be used for matching are: service.name; service.environment; trace.name (root transaction name); and trace.outcome (root transaction outcome). Other attributes are also possible.

Policies may omit any of the attributes. Apart from the service name, omitting an attribute has the effect of grouping all matching traces for the purposes of tail-sampling. For example, if only service name is specified, then all traces originating at the service having that service name will be sampled uniformly. If service name is not specified, then that policy may match any service. Some configurations may implement a hard-coding limit of a set number of service names that may be matched in this way. If the limit is reached, traces from any additional services will not be sampled. If a root transaction matches none of the policies, then it will be dropped, and the trace will not be sampled.

The following paragraphs include example code to implement an embodiment. In one embodiment, an application performance monitoring apm-server can be run with the following configuration:

```
apm-server:
  sampling:
    tail:
      enabled: true
      interval: 10 s
      policies:
        trace.name: many
        sample_rate: 0.5
        trace.name: few
        sample_rate: 0.1
```

Send 1000 transactions with the name "many", and 1000 with the name "few". Wait ~10 seconds. Check that there are 500 "many" transactions, and 100 "few" transactions, indexed into apm-*-transaction:

```
GET /apm-8.0.0-transaction/_search
{
  "size": 0,
  "aggs": {
    "by_name": {
      "terms": {
        "field": "transaction.name",
        "size": 100
      }
    }
  }
}
{
  "took" : 0,
  "timed_out" : false,
  "_shards" : {
    "total" : 1,
    "successful" : 1,
    "skipped" : 0,
    "failed" : 0
```

```
        },
        "hits" : {
          "total" : {
            "value" : 600,
            "relation" : "eq"
          },
          "max_score" : null,
          "hits" : [ ]
        },
        "aggregations" : {
          "by_name" : {
            "doc_count_error_upper_bound" : 0,
            "sum_other_doc_count" : 0,
            "buckets" : [
              {
                "key" : "many",
                "doc_count" : 500
              },
              {
                "key" : "few",
                "doc_count" : 100
              }
            ]
          }
        }
      }
```

FIG. 2 is a diagrammatic representation of an example machine in the form of a computer system 1, within which a set of instructions for causing the machine to perform any one or more of the methodologies discussed herein may be executed. The computer system 1, or a portion of the elements shown such as the processors 5 (which may in some examples be a single processor), instructions 55, one or more memories including the main memory 10, static memory 15, machine readable medium 50, etc., and one or more user interface elements (e.g., video display 35, input device(s) 30, etc.) may be construed for purposes of this disclosure as the computing device described above with initial reference to FIG. 1. In various example embodiments, the computing device operates as a standalone device, or the computing device may be connected (e.g., networked) to other machines or computing devices. In a networked deployment, the computing device may operate in the capacity of a server or a client machine in a server-client network environment, or as a peer machine in a peer-to-peer (or distributed) network environment. The computing device may be a personal computer (PC), a tablet PC, a set-top box (STB), a personal digital assistant (PDA), a cellular telephone, a portable music player (e.g., a portable hard drive audio device such as a Moving Picture Experts Group Audio Layer 3 (MP3) player), a web appliance, a network router, switch or bridge, or any machine capable of executing a set of instructions (sequential or otherwise) that specify actions to be taken by that computing device. Further, while only a single computing device is illustrated, the terms "computing device" or "machine" shall also be taken to include any collection of computing devices or machines that individually or jointly execute a set (or multiple sets) of instructions to perform any one or more of the methodologies discussed herein.

The computer system 1 includes a processor or multiple processor(s) 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The network interface device 45 may be used, for example, as a transceiver for transmitting information across the network to another device, or for receiving information. Collectors, for example, can use network interface devices 45 coupled to their respective computing devices for transmitting and receiving data over the network using any conventional technique. The computer system 1 may further include a data encryption module (not shown) to encrypt data. Further, it will be appreciated that each of the collectors 102A-102N may constitute a computing device or machine. That is, for purposes of this disclosure, the term "collector" may be deemed to include not merely the collector-based code executing on one or more processors, but also the underlying computing device that includes the processor(s) executing the collector code.

The drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 1. The main memory 10 and the processor(s) 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

Where appropriate, the functions described herein can be performed in one or more of hardware, software, firmware, digital components, or analog components. For example, the encoding and or decoding systems can be embodied as one or more application specific integrated circuits (ASICs) or microcontrollers that can be programmed to carry out one or more of the systems and procedures described herein. Certain terms are used throughout the description and claims, and the terms refer to particular system components. As one skilled in the art will appreciate, components may be referred to by different names. This document does not intend to distinguish between components that differ in name, but not function.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized to implement any of the embodiments of the disclosure as described herein.

Figure 3:
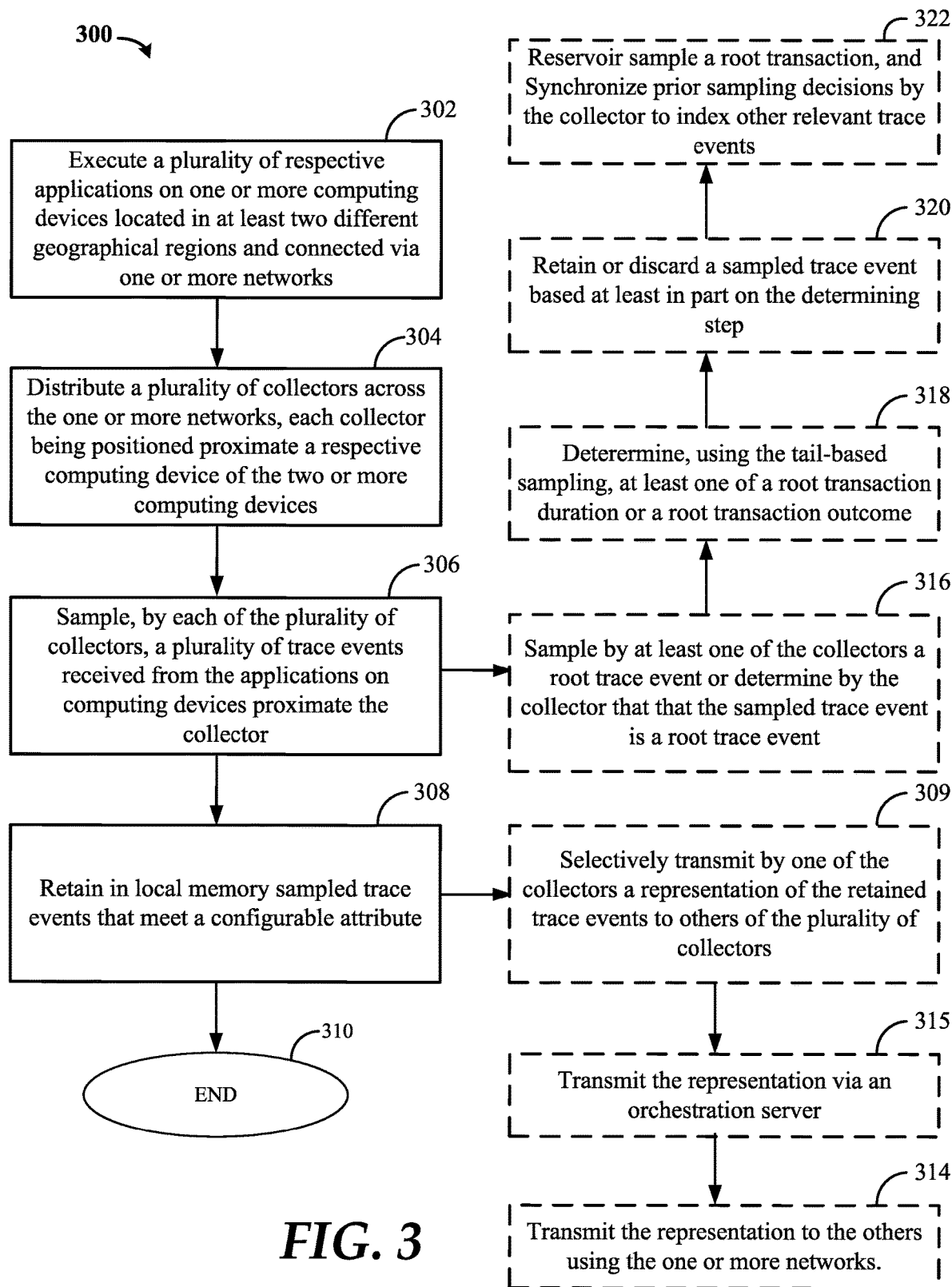
FIG. 3 is a conceptual flow diagram of an exemplary process for implementing a distributed network or multi-network data management system in accordance with various embodiments of the disclosure.

FIG. 3 is a conceptual flow diagram 300 of an exemplary process for implementing a distributed network or multi-network data management system in accordance with various embodiments of the disclosure. The steps enumerated in FIG. 3 may be performed by one or more of the collectors and other computing devices executing applications as shown in FIGS. 1 and 2. For example, the collectors in FIG. 3 may refer to one or more of the plurality of collectors 102A-N. The orchestration server may refer to the orchestration service 106 running on a computing device. The steps may alternatively or additionally be performed, where appropriate in the context, by one or more of the applications 104A-104N executing on the various computing devices described above and illustrated in the figures. The networks referenced in FIG. 3 may refer to network 108, which includes any of the networks or the multi-network platform referenced in greater detail above. The boxes including the dashed lines in FIG. 3 are optional in nature.

With initial reference to FIG. 3, at step 302, an organization, corporation, or user of any kind may be executing a plurality of respective applications on two or more computing devices located in at least two different geographical regions and connected via one or more networks. Next, at step 304, a plurality of corresponding collectors may be distributed across the one or more networks such that each collector is positioned proximate a respective computing device of the two or more computing devices. Referring next to step 306, each of the collectors may proceed to sample a plurality of trace events received from the applications that are executing on the one or more computing devices proximate the sampling collector. In various embodiments, the transmission of the sampled events is performed locally, which in turn can dramatically reduce network congestion while maintaining consistent monitoring of all applications.

Thereafter, at step 308, each sampling collector may proceed to retain in local memory, such as cache memory, random access memory (RAM), flash memory, or a hard or solid-state disk, sampled trace events that meet a configurable attribute. The configurable attribute may represent a feature of the trace events or corresponding trace, such as a duration or an outcome (e.g., success or failure) of the trace. The attribute may in other examples be more specific to the sampled trace event. In other embodiments, the collectors may publish representations of their sampled results to an orchestration server so that the indexing of relevant trace events can be coordinated. In some embodiments, the orchestration does the coordinating. In other embodiments, the collectors do the coordinating. In either event, and unlike conventional techniques, the collectors locally manage many, most, or all of their sampling activities so that the networks are not constantly burdened by large data transfers to and from the orchestration server. The routine may end at node 310.

In other embodiments, after the collectors retain sampled trace events in local storage or in real time during the local buffering, the collectors may selectively transmit a representation of the retained trace events to others of the plurality of collectors, as shown in step 309. As noted above, this transmission may be direct, or in some embodiments, the transmission of the representation may be made via the orchestration server as shown in step 315. That is to say, the collectors can publish abbreviated representational information pertaining to sampled trace events, sampled root events, and the like, and the orchestration server can thereupon distribute this information as necessary to other collectors in the network of collectors. As shown in step 314, the representation from the collectors and/or the orchestration server may take place using the one or more networks.

In some configurations, such as at step 316, the collectors may sample a root trace event. The collector may, for example, determine using a DAG graph or another technique that the sampled trace event is in fact the root event of the trace. Additionally, in some embodiments and as shown in step 318, the collectors, or any of them, may determine various attributes of the sampled root event, such as a root transaction duration or a root transaction outcome. Because the user may desire, as in step 320, to retain trace events that it deems most relevant, the collectors may determine to retain or discard a sampled trace event based at least in part on this determining of root transaction attributes using tail-based sampling. For instance, slow traces or failed traces may be of particular interest to the user or organization, in which case trace events with these types of attributes tend to be retained in local memory and/or published to the orchestration center (using a trace ID, for example).

In still other embodiments such as shown in step 322, one or more of the collectors may reservoir-sample a root transaction. Thereafter, as in step 322, the collectors may synchronize prior sampling decisions made by the relevant collector to index other relevant trace events in the future, for example.

It will be appreciated by those skilled in the art upon reviewing this disclosure that the various sampling activities performed by the different collectors may not be related in time. For example, the applications need not be executing at the same time, although in many cases applications are running in parallel. Nonetheless, the timing of sampling of different collectors, and the timing of the applications executing on the same computing device, or a different computing device is not intended to be limiting, and any timing embodiments are deemed to fall within the spirit and scope of the present disclosure.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description but is not intended to be exhaustive or limited to the present technology in the form disclosed. Many modifications and variations will be apparent to those of ordinary skill in the art without departing from the scope and spirit of the present technology. Exemplary embodiments were chosen and described to best explain the principles of the present technology and its practical application, and to enable others of ordinary skill in the art to understand the present technology for various embodiments with various modifications as are suited to the particular use contemplated.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

The terminology used herein can imply direct or indirect, full or partial, temporary or permanent, immediate or delayed, synchronous or asynchronous, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present.

The terminology used herein is for the purpose of describing particular embodiments only and is not intended to be necessarily limiting of the disclosure. As used herein, the singular forms "a," "an" and "the" are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence or addition of one or more other features, integers, steps, operations, elements, components, and/or groups thereof.

Example embodiments of the present disclosure are described herein with reference to illustrations of idealized embodiments (and intermediate structures) of the present disclosure. As such, variations from the shapes of the illustrations as a result, for example, of manufacturing techniques and/or tolerances, are to be expected. Thus, the example embodiments of the present disclosure should not be construed as necessarily limited to the particular shapes of regions illustrated herein, but are to include deviations in shapes that result, for example, from manufacturing.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

In this description, for purposes of explanation and not limitation, specific details are set forth, such as particular embodiments, procedures, techniques, etc. to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the features, structures, or characteristics may be combined in any suitable manner in one or more embodiments.

Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

What is claimed is:

1. A method of application performance monitoring in one or more networks, comprising:

executing a plurality of respective applications on two or more computing devices located in at least two different geographical regions connected via the one or more networks;

distributing a plurality of collectors across the one or more networks, each collector being positioned proximate a respective computing device of the two or more computing devices;

sampling, by each of the plurality of collectors, a plurality of trace events received from the applications on the computing devices proximate the respective collector;

retaining in local memory sampled trace events that meet a configurable attribute comprising at least one of a latency threshold for completing a trace associated with one or more of the sampled trace events, or a success or failure of the trace, selectively transmitting by one of the collectors across the one or more networks a representation of the retained trace events to others of the plurality of collectors;

transmitting to an orchestration server across the one or more networks information comprising a trace event identified based on a local sampling decision, the orchestration server configured for indexing other information representing sampled trace events obtained from other collectors of the plurality of collectors that correspond with the trace event identified in the information; and publishing sampled trace identifiers (IDs) to the orchestration server to allow other collectors to enable indexing of events related to the trace.

2. The method of claim 1, wherein:

selectively transmitting the representation of the retained sampled trace events further comprises transmitting the representation via an orchestration server; and the orchestration server transmits the representation to the others using the one or more networks.

3. The method of claim 2, wherein the representation comprises a trace identifier (ID).

4. The method of claim 1, further comprising sampling by at least one of the collectors a root trace event.

5. The method of claim 1, further comprising determining by the at least one of the collectors that the sampled trace event comprises a root trace event.

6. The method of claim 1, wherein the sampling by at least one of the collectors comprises tail-based sampling.

7. The method of claim 6, further comprising:
determining, using the tail-based sampling, at least one of a root transaction duration or a root transaction outcome; and
retaining a sampled trace event based at least in part on the determining.

8. The method of claim 1, further comprising:
reservoir-sampling, by at least one of the collectors, a root transaction; and
synchronizing prior sampling decisions by the at least one of the collectors to index any other trace events that are part of a sampled trace.

9. A system for distributed data management, comprising:
a plurality of computing devices geographically distributed and communicatively coupled together via one or more networks, each computing device being configured to execute at least one application;
a plurality of geographically-distributed collectors, each collector being located proximate one or more of the computing devices and configured to:
sample a plurality of trace events from the one or more of the computing devices; and
retain in local memory sampled trace events that meet a configurable attribute comprising at least one of a latency threshold for completing a trace associated with one or more of the sampled trace events, or a success or failure of the trace,
wherein at least some collectors of the plurality of collectors are configured to:
determine a root event of a trace,
pass the root event through a reservoir sampler for making a local sampling decision,
transmit to an orchestration server across the one or more networks information comprising a trace event identified based on the local sampling decision, the orchestration server being configured to index other information representing sampled trace events obtained from other collectors of the plurality of collectors that correspond with the trace event identified in the information, and
publish sampled trace identifiers (IDs) to the orchestration server to allow other collectors to enable indexing of events related to the trace.

10. The system of claim 9, further comprising an orchestration server, wherein at least some collectors of the plurality of collectors are further configured to:
generate a probabilistic set of trace identifiers (IDs); and
transmit the probabilistic set to the orchestration server.

11. The system of claim 10, wherein the probabilistic set comprises a Bloom Filter.

12. The system of claim 9, wherein at least some collectors of the plurality of collectors are further configured to:
perform tail-based sampling of event data to determine a property of a completed trace; and
locally store the trace or portion thereof when the property meets a threshold.

13. The system of claim 12, wherein the property comprises at least one of a root transaction duration or a trace success or failure outcome.

14. The system of claim 12, wherein the at least some collectors are further configured to synchronize sampling decisions to index any other trace events that are part of sampled traces.

15. The system of claim 9, further comprising determining, by at least some collectors of the plurality of collectors, a root event of a plurality of trace events.

16. The system of claim 9, wherein the at least some collectors of the plurality of collectors are configured to identify the root event by transforming sampled trace events into a directed acyclic graph (DAG) or a hierarchical tree.

* * * * *